US00RE40157E

(19) United States
(12) Reissued Patent
Griffin et al.

(10) Patent Number: US RE40,157 E
(45) Date of Reissued Patent: Mar. 25, 2008

(54) HAND-HELD ELECTRONIC DEVICE

(75) Inventors: Jason T. Griffin, Waterloo (CA); Mihal Lazaridis, Waterloo (CA)

(73) Assignee: Research in Motion Limited (CA)

(21) Appl. No.: 29/213,812

(22) Filed: Jun. 16, 2004

Related U.S. Patent Documents

Reissue of:
(64) Patent No.: Des. 461,803
Issued: Aug. 20, 2002
Appl. No.: 29/151,189
Filed: Nov. 1, 2001

(30) Foreign Application Priority Data

May 2, 2001 (CA) ..... 96758

(51) LOC (8) Cl. ..... 14-02
(52) U.S. Cl. ..... D14/346
(58) Field of Classification Search ..... D14/341–346, D14/138; D18/1, 2, 7; 235/145 A, 145 R; 341/22, 23; 345/156, 168, 169, 172, 173; 349/12; 361/680–686; D10/65
See application file for complete search history.

(56) References Cited

U.S. PATENT DOCUMENTS

D359,920 S * 7/1995 Sakamoto ..... D10/65
D367,043 S * 2/1996 Ross et al. ..... D14/346
D381,021 S * 7/1997 Williams et al. ..... D14/138

* cited by examiner

*Primary Examiner*—Freda S Nunn
(74) *Attorney, Agent, or Firm*—Jones Day

(57) CLAIM

We claim the ornamental design for a hand-held electronic device, as shown and described.

DESCRIPTION

1 Claim, 3 Drawing Sheets

Figure 1:
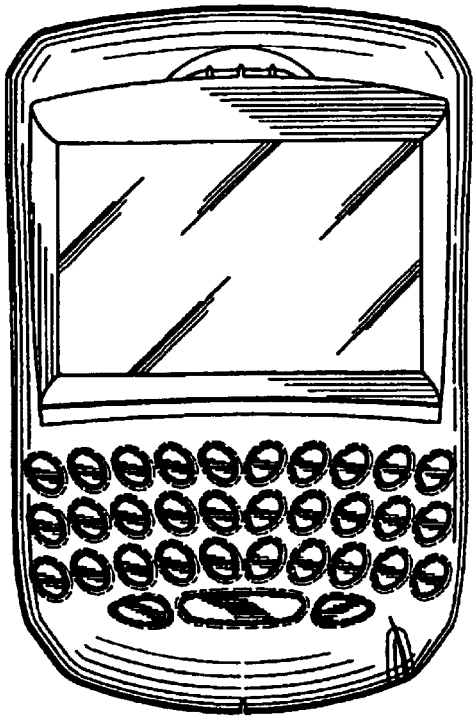
FIG. 1 is a front elevational view of a hand-held electronic device.
Figure 2:
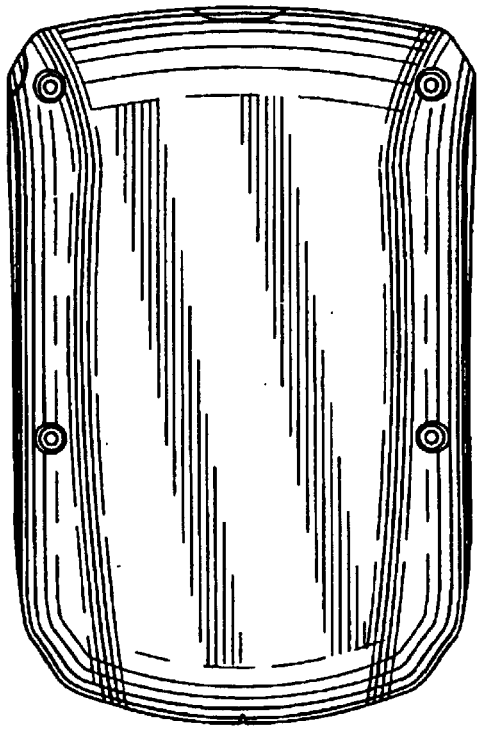
FIG. 2 is a rear elevational view thereof.
Figure 3:
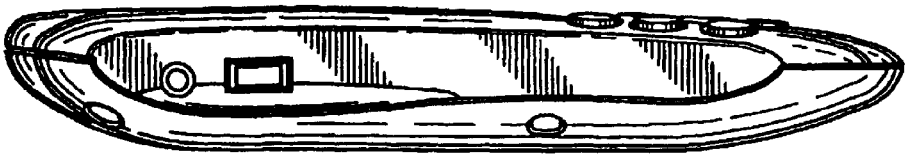
FIG. 3 is a left elevational view thereof.
Figure 4:
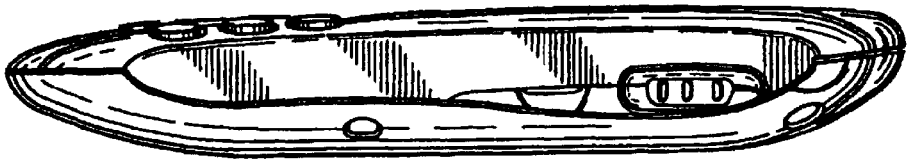
FIG. 4 is a right elevational view thereof.
Figure 5:
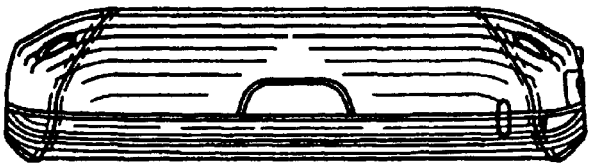
FIG. 5 is a top plan view thereof.
Figure 6:
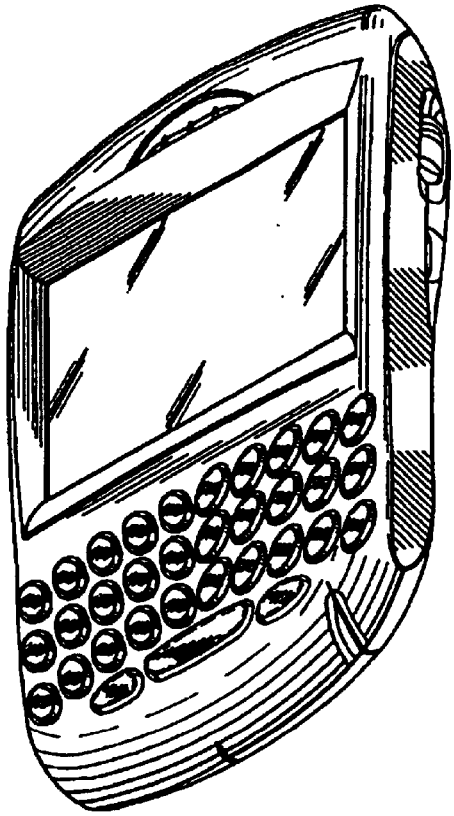
FIG. 6 is a front perspective view thereof.
Figure 7:
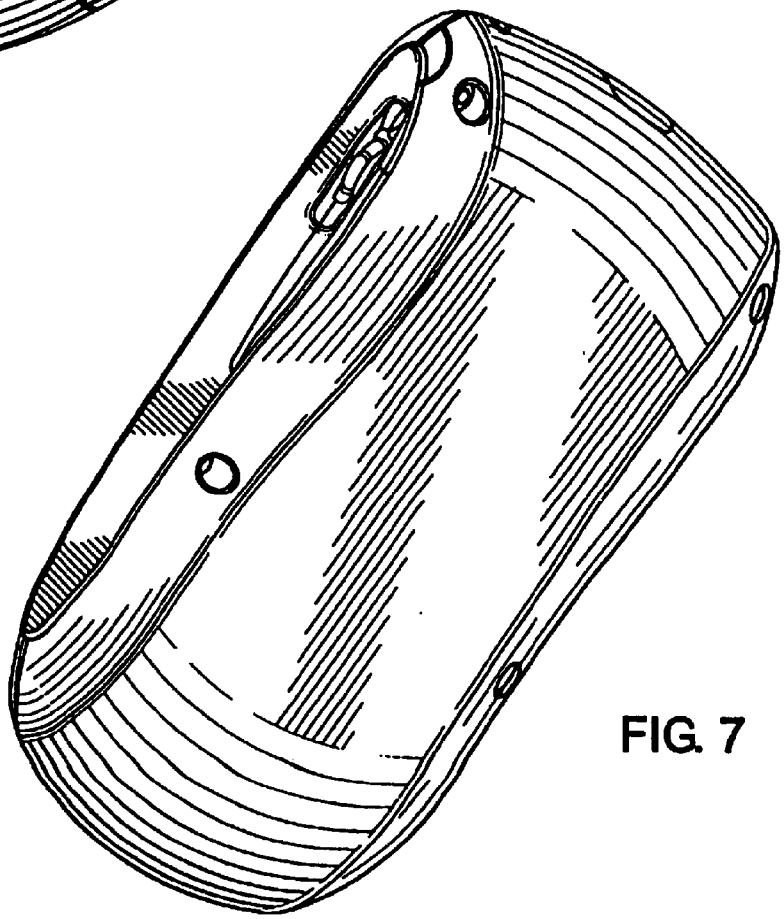
FIG. 7 is a rear perspective thereof.

Matter enclosed in heavy brackets [ ] appears in the original patent, but forms no part of this reissue; matter printed in italics indicates the additions made by reissue.